United States Patent
Fisher

(10) Patent No.: US 10,150,333 B2
(45) Date of Patent: Dec. 11, 2018

(54) HUBCAP FOR AIRCRAFT WHEEL

(75) Inventor: Martin James Fisher, West Midlands (GB)

(73) Assignee: MEGGITT AEROSPACE LIMITED, Coventry (GB)

( * ) Notice: Subject to any disclaimer, the term of this patent is extended or adjusted under 35 U.S.C. 154(b) by 24 days.

(21) Appl. No.: 12/553,529

(22) Filed: Sep. 3, 2009

(65) Prior Publication Data
US 2010/0033007 A1 Feb. 11, 2010

Related U.S. Application Data

(63) Continuation-in-part of application No. 10/599,291, filed as application No. PCT/GB2005/001245 on Mar. 30, 2005, now abandoned.

(30) Foreign Application Priority Data

Apr. 1, 2004 (GB) .................................. 0407470.4

(51) Int. Cl.
*B60B 7/00* (2006.01)
*B64C 25/36* (2006.01)

(52) U.S. Cl.
CPC .......... *B60B 7/0013* (2013.01); *B60B 7/0026* (2013.01); *B64C 25/36* (2013.01)

(58) Field of Classification Search
CPC ....... B60B 7/00; B60B 7/0013; B60B 7/0026; B60B 7/0086
USPC ............................................ 301/108.1–108.4
See application file for complete search history.

(56) References Cited

U.S. PATENT DOCUMENTS

| 6,447,072 B1* | 9/2002 | Johnson ..................... 301/108.2 |
| 2005/0151414 A1* | 7/2005 | Hauler ........................ 301/108.4 |
| 2008/0203811 A1* | 8/2008 | Fisher ........................ 301/108.1 |

* cited by examiner

*Primary Examiner* — Jason R Bellinger
(74) *Attorney, Agent, or Firm* — Renner Kenner, Greive, Bobak, Taylor & Weber Co., LPA

(57) ABSTRACT

A hubcap for an aircraft wheel comprises a generally cup-like body for covering, in use, a free end of an axle. The cup-like body has an end wall, a side wall and an open end opposite the end wall. The hubcap further comprises one or more elongate formations protruding from an outer surface of the side wall and extending from close to the end wall towards the open end of the body, wherein the height of the or each elongate formation varies or tapers continuously or discontinuously from a maximum to a minimum along at least a portion of its length in a direction towards or away from the closed end of the cup-like body.

23 Claims, 5 Drawing Sheets

HUBCAP FOR AIRCRAFT WHEEL

RELATED APPLICATIONS

This application is a continuation-in-part of application Ser. No. 10/599,291, filed on Sep. 25, 2006, now abandoned which was a U.S. National application of PCT Application Number PCT/GB2005/001245, filed on Mar. 30, 2005, claiming priority of British application No. GB 0407470, filed on Apr. 1, 2004.

BACKGROUND

The invention relates to components, in particular hubcaps, for aircraft wheels. It also relates to an aircraft wheel assembly and, in particular, to one in which the assembly incorporates an axle housing sensing means, typically one or more components of a tire pressure sensing means such as a tire pressure indicating system (TPIS). Typically, such a wheel would be a nose wheel. In the case of a main wheel assembly where an antiskid brake control is present, wheel speed sensing means, usually a wheel speed transducer (WST) may also be incorporated.

Two major areas of concern to the aircraft industry are aircraft weight and noise. Reducing aircraft weight gives benefits in performance and cost of operation. This is especially true in the case of wheel and brake components that are only used during ground based maneuvers, such as during the take-off and landing cycles, but are carried with the aircraft throughout the flight. Such wheel and brake components have to be lifted into a storage bay during flight.

Aircraft noise is an area of increasing concern as the pressure for more flights out of busy airports in close proximity to residential housing increases. A significant source of aircraft noise during aircraft landing is created by the flow of air over undercarriage components when the landing gear is lowered from the storage bay when the aircraft is at low altitude during final approach to the runway.

All components of the landing gear, including the wheels, can contribute to the generation of noise when exposed to the air stream during landing so any reduction in the noise generation by any component will contribute to a quieter aircraft.

Attempts have been made to reduce noise from aircraft wheels during landing by using shields to smooth airflow over the wheel, however, such shields can reduce the flow of air required for cooling brakes, leading to thermal management problems and longer turn around times for aircraft. Where the axle protrudes beyond the wheel rim position it is found that the axle end and any fixing mechanism on the axle are a major source of the wheel noise and are not affected by such shields. Nose wheels are typically configured with an axle extending beyond the wheel rim.

Aircraft wheel and brake assemblies are typically mounted on a hollow axle, within which are mounted at least in part other components such as, for example, wheel speed transducers (WSTs) and/or one or more components of the tire pressure indicating system (TPIS). To prevent the ingress of dirt and moisture to mechanical and electronic components around and within the axle it is common practice to fit a cover known as a "hubcap" over the end of the axle.

OBJECTS OF THE INVENTION

It is one object of this invention to provide an improved cover known as a hubcap.

It is a further object of this invention to provide an aircraft wheel assembly incorporating such a hubcap.

It is yet another object of this invention to reduce the weight of a wheel assembly.

It is yet a further object of this invention to reduce noise associated with airflow over a wheel assembly.

SUMMARY OF THE INVENTION

Thus, a first aspect of the invention provides a hubcap for an aircraft wheel, comprising a generally cup-like body for covering, in use, a free end of an axle, the cup-like body having an end wall, a side wall and an open end opposite the end wall, the hubcap further comprising one or more elongate formations protruding from an outer surface of the side wall and extending from close to the end wall towards the open end of the body, wherein the height of the or each elongate formation varies or tapers continuously or discontinuously from a maximum to a minimum along at least a portion of its length in a direction towards or away from the closed end of the cup-like body.

A second aspect of the invention provides an aircraft wheel assembly comprising an axle having a free end extending beyond a wheel disposed around said axle; and a hubcap comprising a generally cup-like body for covering, in use, the free end of the axle, the cup-like body having an end wall, a side wall and an open end opposite the end wall, the hubcap further comprising one or more elongate formations protruding from an outer surface of the side wall and extending from close to the end wall towards the open end of the body, wherein the height of the or each elongate formation varies or tapers continuously or discontinuously from a maximum to a minimum in a direction towards or away from the closed end of the cup-like body.

A further aspect of the invention provides an aircraft comprising a hubcap and/or a wheel assembly according to the invention.

As used herein, the height of the or each formation refers to the distance the or each formation protrudes from the outer surface of the side wall, as measured in a direction perpendicular to the outer surface of the side wall.

The maximum height may be from 5 mm to 50 mm, preferably from 5 mm to 35 mm, more preferably from 15 mm to 35 mm.

The minimum height may be from 0 mm to 25 mm, preferably from 0 mm to 20 mm.

Preferably, the hubcap may comprise from two to 12, more preferably from two to 10, most preferably from four to eight, elongate formations.

Preferably, the cup-like body may be castellated at least in part. Preferably, the side wall may comprise one or more, e.g. a plurality of, ledge portions. For instance, between two and twelve, preferably between five and ten, say seven, ledge portions may be provided.

The or each ledge portion may be substantially horizontal or flat. Alternatively, the or each ledge portion may be inclined or curved at least in part.

The or each ledge portion may be contiguous with an upper edge of an upstanding wall.

The upstanding wall may be provided between the or each ledge portion and the or a flange. The upstanding wall may be substantially vertical. Alternatively, the upstanding wall may be sloping or curved at least in part.

Preferably, the side wall is provided with a flange which extends radially outwards and is located at or towards the open end of the body.

The flange may have one or more extension portions with apertures therethrough for receiving securing means, in use.

Preferably, the or each formation is shaped to influence, in use, the flow of air around the hubcap and/or a wheel assembly comprising the hubcap, whereby to reduce the level of noise generated by said flow of air. Additionally or alternatively, the or each formation may serve to stiffen the hubcap.

The or each elongate formation may comprise a rib or fin.

The or each elongate formation may be hollow.

The or each elongate formation may be of substantially uniform width along its length. Alternatively, the width of the or each elongate formation may vary. For instance, the or each elongate formation may be wider at the end closer to the open end of the cup-like body than at the end closer to the end wall of the cup-like body.

The or each elongate formation may be substantially straight. Alternatively, the or each elongate formation may comprise one or more curved portions.

The hubcap may be provided with at least one slot. Preferably, the or each slot may be provided in a portion of the side wall of the hubcap, which portion may comprise a protruding formation. Preferably, the or each protruding formation may have a different width from the or each elongate formation. For instance, the or each protruding formation may be broader than the or each elongate formation. The height of the or each protruding formation may be substantially uniform or it may vary or taper.

The slot may extend from the open end of the cup-like body towards the end wall.

Preferably, the hubcap may be formed as a single piece.

Typically, the free end of the axle may be open. Preferably, the axle may be hollow.

Typically, a tire located around the wheel may be fitted with a TPIS sensor. The TPIS sensor may pass through the rim of the wheel.

Preferably, a signal cable may be provided to allow communication between the TPIS sensor and a TPIS commutator. The TPIS commutator may be located at least in part within the axle.

With the hubcap in place, the signal cable may pass, in use, through a or the slot in the cup-like member.

Optionally, means for sensing wheel speed, e.g. a WST, may be housed at least in part within the axle. For instance, the WST may be located inboard of the TPIS commutator.

The hubcap may comprise means for driving the or a wheel speed sensing means. For instance, the inner surface of the end wall may be provided with one or more formations for engagement with the means for sensing wheel speed or a part thereof.

In the case of a main wheel, the aircraft wheel assembly will typically incorporate means for sensing tire pressure and the hubcap may incorporate means for mounting the tire pressure sensing means.

The hubcap may be made of a metal or alloy or plastics or composite using suitable manufacturing techniques. Examples include aluminium alloy; steel, titanium, magnesium; polymer matrix composites and metal matrix composites.

Another aspect of the invention provides a hubcap for an aircraft wheel comprising a cup-like body having an end wall, a side wall disposed therefrom and extending to an open end opposite the end wall, and a plurality of elongate formations protruding from the side wall, wherein the side wall further comprises at least one ledge portion between a pair of the elongate formations, thereby providing the cup-like body with an at least partially castellated form.

In a further aspect of the invention, there is provided a hubcap for an aircraft wheel comprising a cup-like body having an end wall, a side wall and an open end opposite the end wall, further comprising a plurality of spaced-apart elongate formations protruding from the side wall and extending from close to the end wall towards the open end of the body, wherein at least one of the elongate formations is broader than the others.

Preferably, a slot may be provided in the or each broader elongate formation.

A hubcap of the invention may be useful in the case of a nose wheel axle, when it may reduce the noise caused by airflow over the tire, nose wheel and axle assembly. It may be useful also in the case of a main wheel axle when the airflow is over the tire, main wheel brake and axle assembly.

BRIEF DESCRIPTION OF THE DRAWINGS

In order that the invention may be well understood, it will now be described by way of illustration only with reference to the accompanying diagrammatic drawings, in which.

DESCRIPTION OF THE PREFERRED EMBODIMENT

Figure 1:
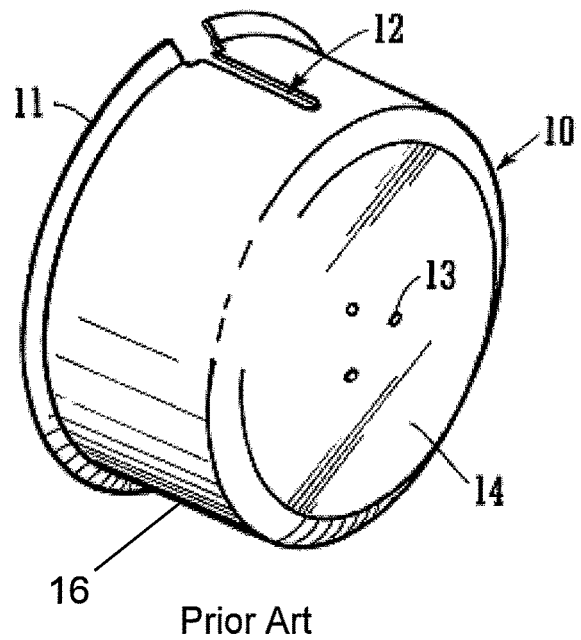
FIG. 1 is a perspective view from one end of the exterior of a known hubcap.
Figure 2:
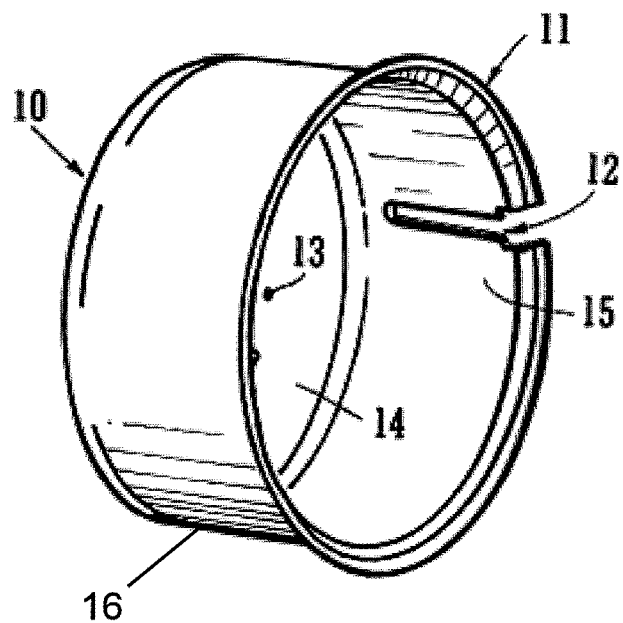
FIG. 2 is a perspective view from the open end of the hubcap of FIG. 1 showing the inside.

The known hubcap 10 of FIGS. 1 and 2 comprises a cup-like body 16 having a flange 11 at the mouth onto which a "V" clamp (not shown) is affixable, in use, to hold the hubcap to the wheel (not shown). The body is parallel sided. A slot 12 extends from the open end of the cap in a side wall for location of TPIS components (not shown). A number of locations 13 are present in the end wall 14 of the hubcap equally spaced around the centre point for driving the WST (not shown).

The hubcap 10 fits over the end of the wheel axle (not shown) with clearance between the axle outer diameter and the inner surface 15 and end wall 14 of the hubcap 10. The axle is hollow and houses wheel speed transducers and the TPIS. The free end of the axle protrudes beyond the wheel rim.

It is an essential feature of the hubcap that it should have sufficient strength and stiffness to mount the TPIS and drive the WST during service. The wall thickness of such a known hubcap with an overall length of 137 mm is 3 mm.

Figure 3:
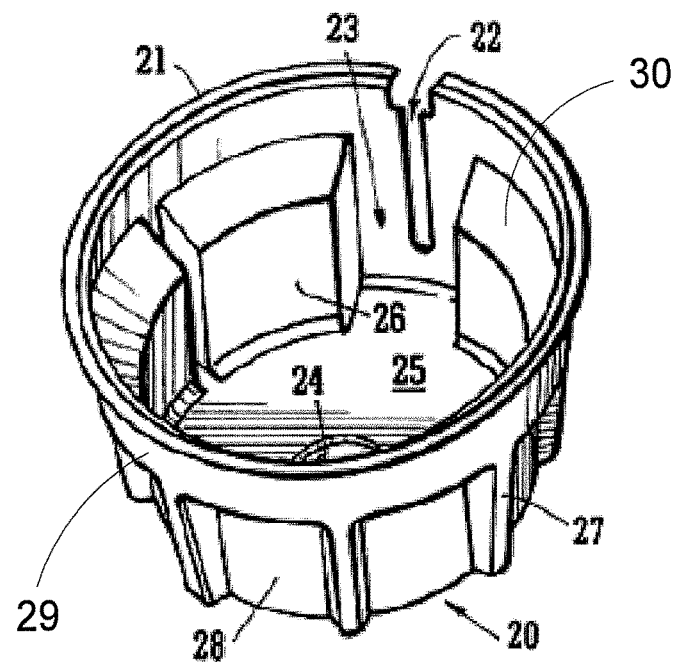
FIG. 3 is a view showing the interior of a hubcap of the invention for a main wheel.
Figure 4:
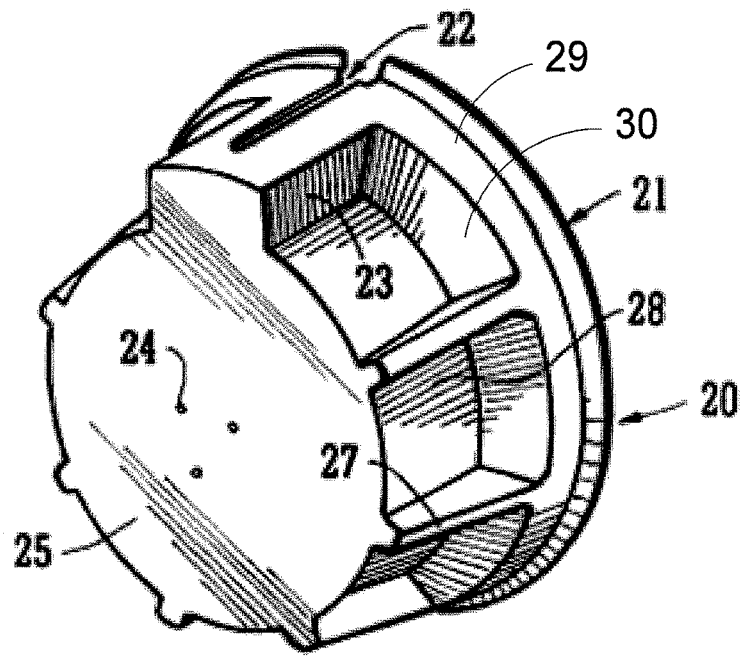
FIG. 4 is an end view showing the exterior of the hubcap of FIG. 3.

An embodiment of a hubcap 20 of the invention is shown in FIGS. 3 and 4. The hubcap 20 comprises a cup-like body 28 having an end wall 25 and is made of aluminium alloy. The body 28 has an open end opposite the end wall 25.

Around the open end of the body there is provided a lip flange 21. The flange 21 is wider in diameter than the longest dimension across the end wall 25.

The flange 21 extends continuously around the open end of the body 28 except for at a portion 23 of the body 28, in which a slot 22 is provided. The slot 22 extends from the flange 21 and terminates more than half-way up the cup-like body 28 towards the end wall 25. The slot 22 has a wider portion at its end close to the flange 21. The remainder of the length of the slot 22 is narrower.

The cup-like body 28 is castellated. An upstanding wall 29 extends upwards from the lip flange 21. Preferably, the upstanding wall 29 may be substantially vertical. The upstanding wall 29 extends the full height of the cup-like body 28 at the portion 23, in which the slot 22 is provided. Elsewhere, the upstanding wall extends about one fifth of the full height of the cup-like body 28 where it meets the lower edge of an inwardly extending, inclined ledge 30.

The upper edge of the ledge 30 is joined to the end wall 25 by a substantially vertical wall.

The castellation of the cup-like body 28 is completed by a plurality of ribs or fins 27.

The ribs or fins 27 are equally spaced about the exterior of the body 28 on each side of the slot 22. The sides of the portion 23 and each of the ribs or fins 27 combine with the ledge 30 to provide seven castellated portions or recesses around the perimeter of the hubcap 20.

The ribs 27 and portion 23 are hollow. The ribs 27 have a tapered height profile such that they protrude from the end wall 25 with a minimum height of 12.5 mm at the closed end of the hubcap 20 increasing to a maximum height of 26.7 mm towards the ledge 29 adjacent the open end of the hubcap 20. The dimension across the width of the ribs 27 is 16 mm and the overall length of the ribs is 97.3 mm. Accordingly, it will be appreciated that the ribs 27 are parallel sided. Preferably, the number of fins may be between 2 and 10, more preferably between 4 and 8. Advantageously, the presence of the ribs 27 provides an improved stiffness, thereby allowing a reduction in the wall thickness to 2 mm for a component of equivalent footprint to that described in FIGS. 1 and 2 with a reduction in weight in the order of 1 kg. Such a weight reduction for each wheel assembly is significant because between 4 and 20 main wheels and 2 or 4 nose wheels might be fitted to an aircraft.

The portion 23 of the body 28, in which the slot 22 is provided, is considerably wider than each of the ribs 27 and, also, does not taper in the same manner as each of the ribs 27.

Drive location formations 24 are present on the inner surface of the end wall 25 for the WST. In use, the hubcap 20 may be fitted over an end of an axle by means of a V clamp.

The cup-like body 28 is dimensioned so that a clearance is provided, in use, between the outer diameter of the axle and the inner surface 26 and end wall 25 of the hubcap 20.

The hubcap shown is for the main wheel axle of a large civil airliner fitted with 20 main wheels and 4 nose wheels. The total weight saving for such aircraft by the use of hubcaps of the invention is in the order of 20 kg.

It has been found that the reduction in weight is not the only benefit of a hubcap of the invention. Computational Fluid Dynamics (CFD) analysis of airflow around the complete tire, wheel, brake and axle has shown that the ribs 27 smooth the airflow around the hubcap 20. In flight and with the landing gear down, e.g. shortly after take-off or before landing, noise is generated by pressure fluctuations resulting from complex flow patterns and separating flow regions. The reduction in noise level by use of a hubcap 20 of the invention is thought to be a result of reducing such pressure fluctuations. The noise reduction benefit of the hubcap 20 is particularly pronounced where the hubcap 20 protrudes outside the wheel rim. It has been found that noise levels may be reduced at each wheel by up to 3 dB.

It has been found in CFD analysis that providing a single or double curvature in the rib or fin profile has additional benefits in noise reduction over the straight section shown in the embodiment of FIGS. 3 and 4. However, this increases design, manufacturing and logistics complexity as the curvature is required to be left and right handed for fitment to wheels on each side of the landing gear.

It is also preferred that the fins 27 should be of a tapered form with the lowest part of the taper being at the closed end of the hubcap 20 furthest from the wheel and the tallest part of the taper being at the open end of the hubcap 20 closest to the wheel. The height dimension of the tapered fin should be in the range 0 mm to 25 mm, preferably 5 mm to 20 mm at the lowest part and 5 mm to 50 mm, preferably 15 mm to 35 mm at the tallest part.

Figure 5:
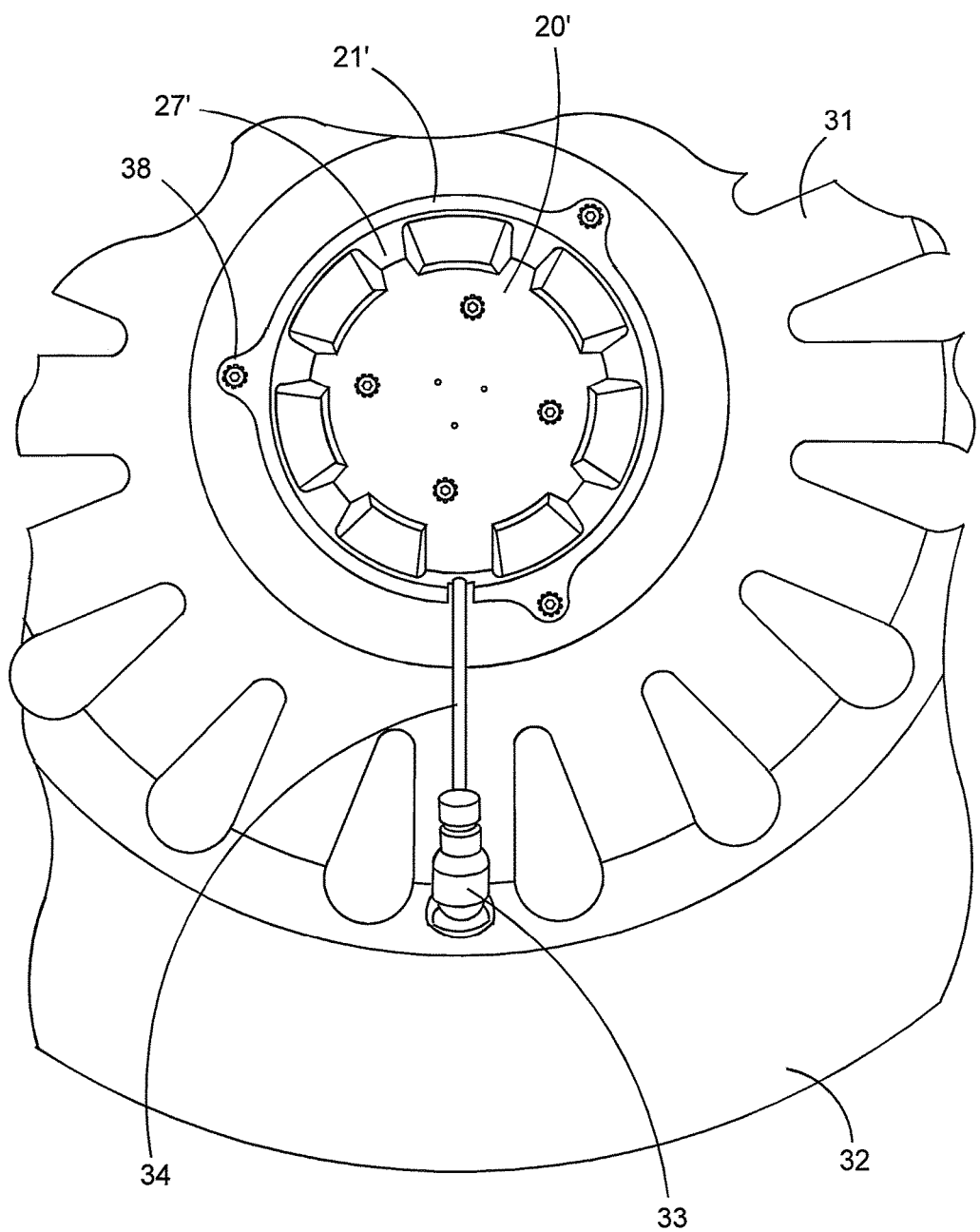
FIG. 5 shows a portion of an aircraft wheel with a hubcap according to the present invention fixed thereto.

FIG. 5 shows a portion of an aircraft wheel 31. Fixed to the centre of the wheel 31 over an end of a hollow axle (not shown) is an embodiment of a hubcap 20' according to the invention.

A tire 32 is disposed around the wheel 31. The tire 32 is fitted with a TPIS pressure sensor 33 passing through the wheel rim. The TPIS pressure sensor 33 is connected to a signal cable 34 which provides communication between the TPIS pressure sensor 33 and a TPIS commutator (not shown) accommodated in part within the axle, underneath the hubcap 20'.

The embodiment of the hubcap 20' is broadly similar to the hubcap 20 described above and shown in FIGS. 3 and 4. However, as shown in FIG. 5, the flange 21' of the hubcap 20' is provided with three equidistantly-spaced extension portions 38 with apertures therethrough for receiving securing means, e.g. screws, bolts or the like, to fix the hubcap 20' to the wheel 31, in use.

Another difference between the hubcap 20' shown in FIG. 5 and that shown in FIGS. 3 and 4 is in the shape of the ribs 27'. In FIG. 5, the dimension across the ribs 27' tapers from a maximum at the base of each of the ribs 27' to a minimum at the top of each of the ribs 27'. Hence, it will be appreciated that the ribs 27' of the embodiment of the hubcap 20' shown in FIG. 5 taper in two dimensions, i.e. the height by which the ribs 27' protrude from the side wall of the hubcap 20 and the dimension across the ribs 27'.

Figure 6:
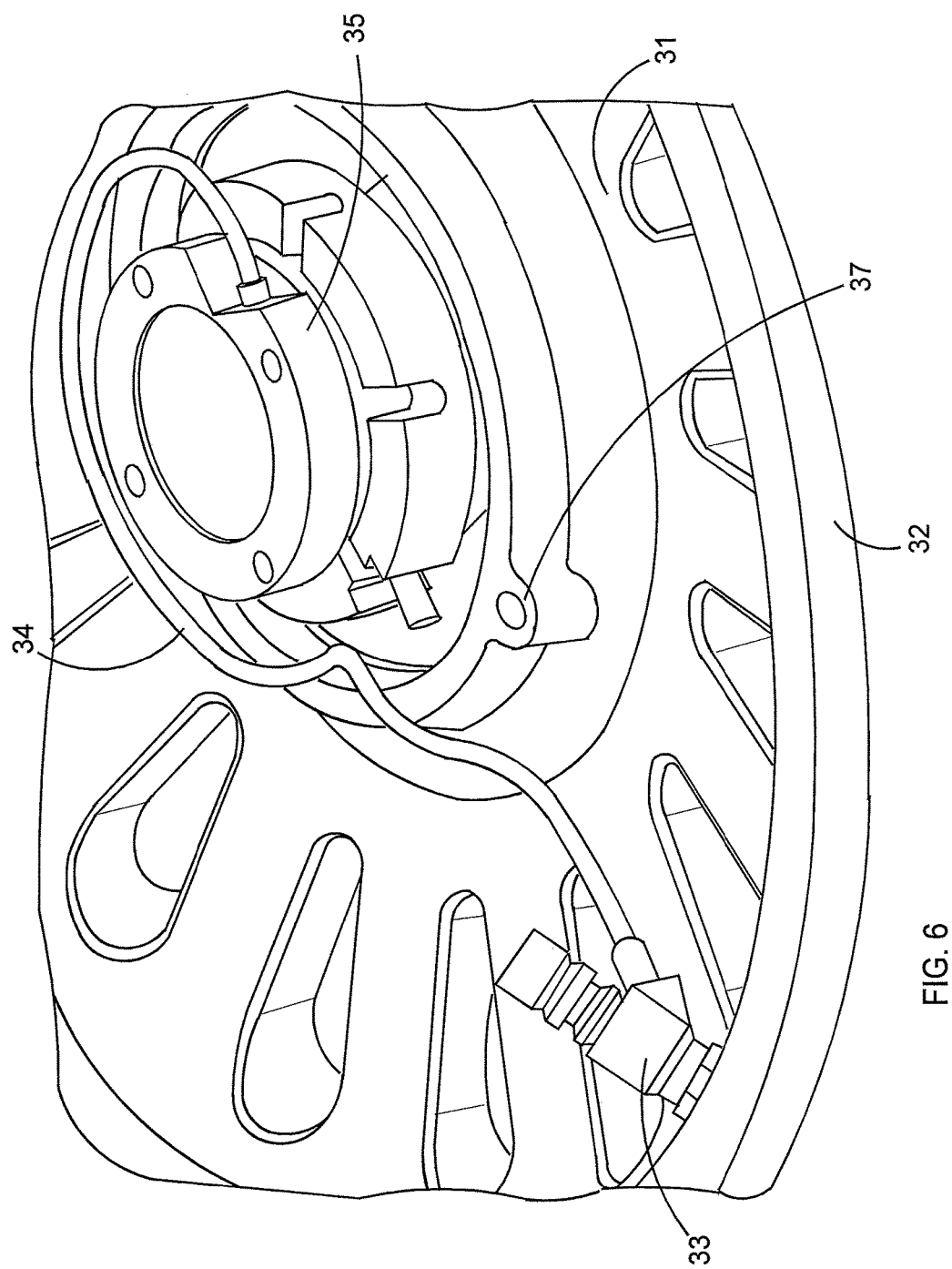
FIG. 6 shows a similar arrangement to that of FIG. 5, only without the hubcap being in place.

FIG. 6 shows a similar arrangement to that of FIG. 5, only without the hubcap being in place. Like features have been given the same reference numerals as in previous Figures.

In FIG. 6, there is shown a portion of an aircraft wheel 31, around which is disposed a tire 32. The tire 32 is fitted with a TPIS pressure sensor 33 passing through the wheel rim. The TPIS sensor is connected to a TPIS commutator 35 located at the centre of the wheel 31 and accommodated in part within a hollow axle. As shown in FIG. 6, in a central portion of the wheel, there are provided three equidistantly-spaced apertures 37 for receiving securing means, in use, the apertures 37 being positioned so as to align with the apertures passing through the extension portions 38 of the hubcap 20'.

As shown in FIG. 6, the signal cable 34 extends initially away from the TPIS pressure sensor 33 across the wheel 31 and towards the centre thereof in a substantially radial direction. Close to the TPIS commutator 35, the signal cable 34 changes direction and loops around the commutator 35 to a fitting located some distance around the commutator 35. As shown in FIG. 6, the signal cable 34 loops around the commutator 35 by slightly more than 180°.

As will be appreciated from FIG. 5, when a hubcap 20, 20' according to the invention is in place, the loop of the signal cable 34 and the TPIS commutator 35 are covered by the hubcap 20, 20', the signal cable 34 passing through the slot 22 provided in the hubcap 20, 20'.

Figure 7:
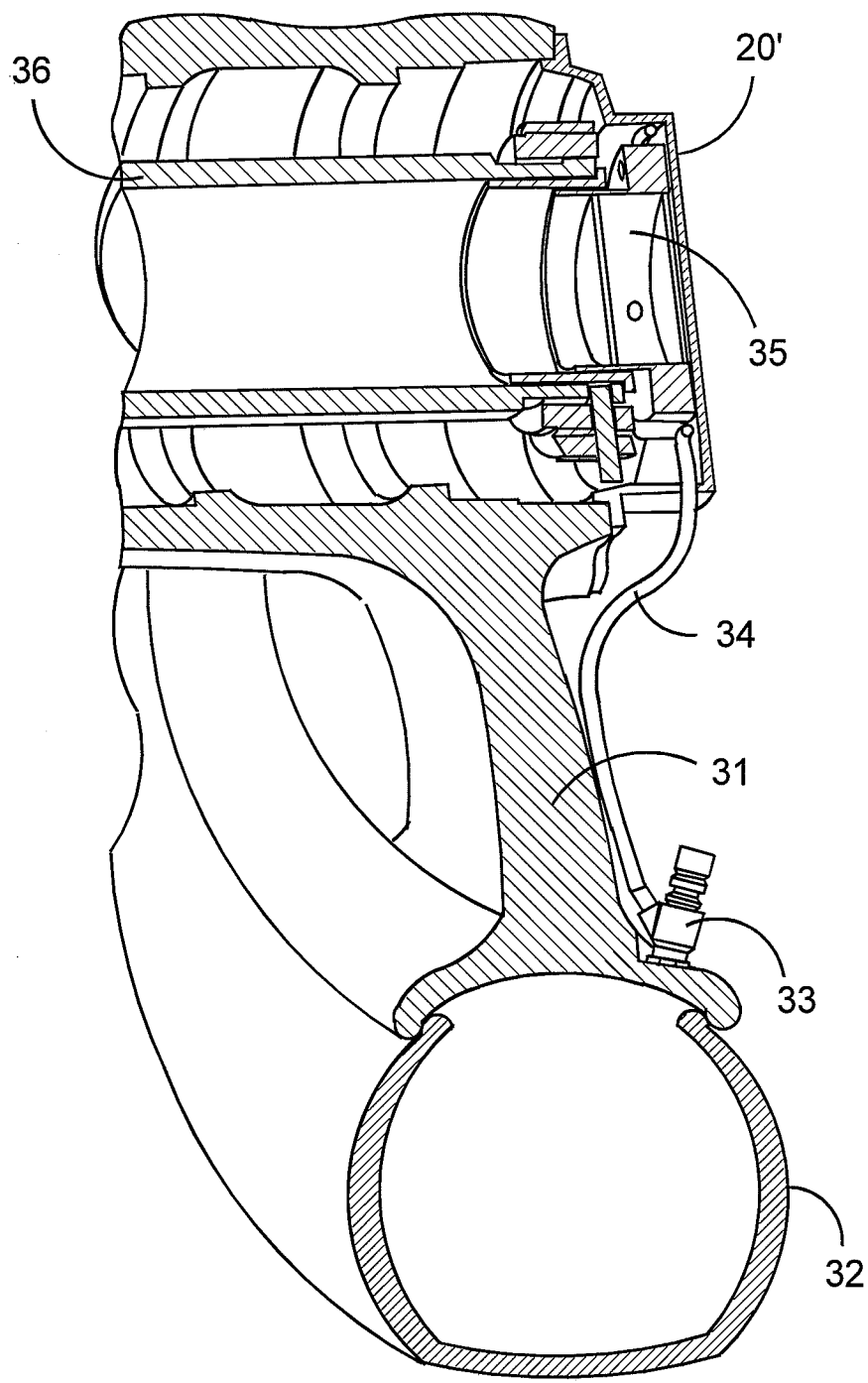
FIG. 7 shows a cross section of a portion of an aircraft wheel with a hubcap according to the present invention fixed thereto.

FIG. 7 shows a cross section of a portion of an aircraft wheel 31 with a hubcap 20' in place over an end of a hollow axle 36. Like features will be given the same reference numerals as in previous Figures.

Disposed around the wheel 31 there is a tire 32. As in FIGS. 5 and 6, a TPIS sensor 33, which passes through the wheel rim, is fitted to the tire 32. A signal cable 34 connects the TPIS sensor 33 to a TPIS commutator 35, located beneath the hubcap 20'.

As FIG. 7 shows clearly, the TPIS commutator 35 is housed in part within the hollow axle 36. Optionally, a wheel speed transducer (WST) (not shown) may also be installed within the hollow axle 36, typically inboard of the TPIS commutator 35.

The invention is not limited to the embodiment shown. For instance, not all the ribs need be the same. Depending on the material used and its shape or size the ribs may be solid. The wall of the cap may or may not be parallel sided.

The invention claimed is:

1. An aircraft wheel fitted with a hubcap, said hubcap comprising a generally cup-like body covering a free end of an axle, the cup-like body having an end wall, a side wall and an open end opposite the end wall, the hubcap further comprising one or more elongate formations protruding from an outer surface of the side wall and extending from the end wall towards the open end of the body, wherein the height of elongate formation varies or tapers between a closed end and the open end of the cup-like body, said configuration of said aircraft wheel hubcap attenuating noise otherwise generated by said hubcap when exposed to an airstream when said aircraft wheel is lowered from a storage bay of an aircraft during final approach to a runway.

2. An aircraft wheel fitted with a hubcap according to claim 1, wherein the maximum height of each elongate formation is from 5 mm to 50 mm and the minimum height of each elongate formation is from 0 mm to 25 mm.

3. An aircraft wheel fitted with a hubcap according to claim 1, wherein the side wall is provided with a flange which extends radially outwards and is located at or towards the open end of the body.

4. An aircraft wheel fitted with a hubcap according to claim 1, wherein the cup-like body is castellated at least in part.

5. An aircraft wheel fitted with a hubcap according to claim 1, comprising from two to twelve elongate formations.

6. An aircraft wheel fitted with a hubcap according to claim 1, wherein each formation is hollow.

7. An aircraft wheel fitted with a hubcap according to claim 1, wherein the width of each formation along the elongate formation length is substantially uniform.

8. An aircraft wheel fitted with a hubcap according to claim 1, wherein the side wall is provided with a slot, which extends from the open-end of the cup-like body towards the end wall.

9. An aircraft wheel fitted with a hubcap according to claim 1, wherein each formation comprises a rib or fin.

10. An aircraft wheel fitted with a hubcap according, to claim 1, wherein the side wall comprises at least one ledge portion.

11. An aircraft wheel fitted with a hubcap according to claim 10, wherein the side wall comprises between two and twelve ledge portions.

12. An aircraft wheel fitted with a hubcap, said hubcap comprising a cup-like body having an end wall, a side wall extending to an open end opposite the end wall, and a plurality of elongate formations protruding from the side wall, wherein the side wall further comprises at least one ledge portion between a pair of the elongate formations, thereby providing the side wall of the cup-like body with an at least partially castellated form, said configuration of said aircraft wheel hubcap attenuating noise otherwise generated by said hubcap When exposed to an airstream when said aircraft wheel is lowered from a storage bay of an aircraft during final approach to a runway.

13. An aircraft wheel fitted with a hubcap, said hubcap comprising a cup-like body having an end wall, a side wall and an open end opposite the end wall, further comprising a plurality of spaced-apart elongate formations protruding from the side wall and extending from the end wall towards the open end of the body, wherein at least one of the elongate formations has a width greater than the width of the other elongate formations, said configuration of said aircraft wheel hubcap attenuating noise otherwise generated by said hubcap when exposed to an airstream when said aircraft wheel is lowered from a storage bay of an aircraft during final approach to a runway.

14. An aircraft wheel fitted with a hubcap according to claim 13, wherein a slot is provided in the wider of the elongate formations.

15. An aircraft wheel fitted with a hubcap according to claim 13, wherein said wheel is disposed around an axle and the hubcap covers the free end of the axle.

16. An aircraft wheel fitted with a hubcap according to claim 12, wherein said wheel is disposed around an axle and the hubcap covers the free end of the axle.

17. An aircraft wheel fitted with a hubcap according to claim 13, wherein said wheel is disposed around an axle and the hubcap covers the free end of the axle.

18. An aircraft comprising at least one aircraft wheel fitted with a hubcap according to claim 1.

19. An aircraft comprising at least one aircraft wheel fitted with a hubcap according to claim 12.

20. An aircraft comprising at least one aircraft wheel fitted with a hubcap according to claim 13.

21. An aircraft comprising at least one aircraft wheel fitted with a hubcap according to claim 15.

22. An aircraft comprising at least one aircraft wheel fitted with a hubcap according to claim 16.

23. An aircraft comprising at least one aircraft wheel fitted with a hubcap according to claim 17.

* * * * *